United States Patent Office 2,946,785
Patented July 26, 1960

2,946,785

16β,17β-EPOXY-1,3,5(10)-ESTRATRIENES

William F. Johns, Morton Grove, and George P. Mueller, Park Ridge, Ill., assignors to G. D. Searle & Co., Chicago, Ill., a corporation of Delaware No Drawing. Filed Oct. 20, 1958, Ser. No. 768,083

4 Claims. (Cl. 260—239.55)

The present invention relates to 16β,17β-epoxy-1,3,5(10)-estratriene derivatives which can be represented by the structural formula

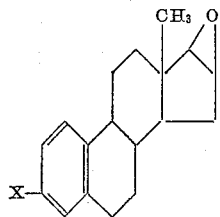

wherein X is selected from the group consisting of hydrogen, lower alkoxy, and lower alkanoyloxy. Lower alkoxy groups which X can represent include methoxy, ethoxy, propoxy, butoxy, amyloxy, hexyloxy, octyloxy, and branched-chained isomers of the foregoing. Among the lower alkanoyloxy groups which X can represent are particularly the acyloxy radicals of carboxylic acids such as formoxy, acetoxy, propionoxy, butyroxy, isobutyroxy, valeryloxy, isovaleryloxy, hexanoyloxy, heptanoyloxy and octanoyloxy.

The 16β,17β-epoxy-1,3,5(10)-estratrienes of the present invention can be prepared by treating an appropriate 16α-halo-1,3,5(10)-estratrien-17β-ol with a solution of potassium hydroxide in methanol and isolating the product. As a specific example, reaction of 16α-bromo-1,3,5(10)-estratrien-17β-ol with a solution of potassium hydroxide in methanol and isolation of the product affords 16β,17β-epoxy-1,3,5(10)-estratriene.

The necessary 16α-halo-17β-ols are prepared by a series of three reactions utilizing as the initial starting material the appropriate 1,3,5(10)-estratrien-17-one. The latter is first converted to the enol alkanoate by heating at about 150° for about 4 hours with the desired alkanoyl anhydride and p-toluenesulfonic acid and recovering the product. The enolalkanoate is then treated with a halogen in an inert solvent such as carbon tetrachloride, the excess halogen destroyed and the 16α-halo-1,3,5(10)-estratrien-17-one isolated. The latter is converted to the required 16α-halo-1,3,5(10)-estratrien-17β-ol by treatment with a reducing agent such as lithium aluminum hydride or sodium borohydride and isolating the product. As a specific example of this series of reactions 3-desoxyestrone enol acetate can be made by distilling 3-desoxyestrone with isopropenyl acetate and p-toluenesulfonic acid and isolating the product. The enol acetate is then treated with bromine in carbon tetrachloride, the excess bromine destroyed with sodium bisulfite and 16α-bromo-1,3,5(10)-estratrien-17-one isolated. Reaction of the latter in tetrahydrofuran with lithium aluminum hydride followed by destruction of the excess lithium aluminum hydride with acid and isolation of the products affords 16α-bromo-1,3,5(10)-estratrien-17β-ol.

Suitable 3-(lower-alkoxy)-1,3,5(10)-estratrien-17-ones (estrone 3-(lower-alkyl)-ethers) as initial starting materials can be made by refluxing estrone with the desired alkyl halide and an acid binding agent such as potassium carbonate in alcoholic solution, filtering, evaporating the filtrate to dryness, collecting and purifying the product. The resulting estrone 3-alkyl ether is then carried through the same process indicated above to yield the 3-alkoxy-16β,17β-oxido-1,3,5(10)-estratriene of this invention.

Likewise, when estrone itself is submitted to the process described above, 3-hydroxy-16β,17β-epoxy - 1,3,5(10)-estratriene is obtained. This may be acylated with the appropriate alkanoic acid anhydride in pyridine solution to yield the 3 - alkanoyloxy - 16β,17β-epoxy - 1,3,5(10)-estratriene of this invention. As a specific example 3-hydroxy-16β-17β-epoxy-1,3,5(10)-estratriene is treated with isobutyric anhydride in pyridine solution to yield 16β,17β-epoxy-3-isobutyroxy-1,3,5(10)-estratriene.

Although two series of stereoisomeric oxides can exist, the β-oxides are preferentially obtained by the process disclosed herein.

The compounds of the present invention have valuable pharmacological properties. Broadly, their usefulness can be said to result from the fact that they exhibit certain of the biological characteristics which are associated with the natural estrogenic hormones, while at the same time they exhibit remarkably little estrogenic activity. It is well-known that certain applications of estrogenic hormones such as estrone and estradiol are limited and in many cases made entirely impractical because of the estrogenic effects they produce. One of these applications is in the treatment of the degenerative diseases associated with abnormal chloesterol metabolism and deposition. It is recognized that estrogenic hormones exhibit an inhibitory and consequently beneficial effect on the arterial deposition of chloesterol, and it is widely agreed that this anti-atherogenic effect is achieved by a reduction in the serum ratio of cholesterol to phospholipids. This result is commonly, but not necessarily, accompanied both by a reduction in the serum concentration of cholesterol and an increase in the serum phospholipids concentration. The reduction in the serum ratio of cholesterol to phospholipids can be designated as a "lipid effect" and regarded as a measure of anti-atherogenic activity; and for any particular compound quantitative comparisons can be made between this effect and the estrogenic effect associated therewith. It has been found that in the compositions of the present invention the ratio of the lipid effect to the estrogenic effect has been markedly increased as compared with the corresponding ratios which are characteristic of the natural estrogenic hormones. For example, 3-methoxy-16β,17β-epoxy-1,3,5(10)-estratriene exhibits 80% of the lipodiatic activity of estrone while exhibiting only 2% of the estrogenic activity of estrone. Thus, the ratio of lipodiatic activity to estrogenic activity as compared to the same ratio for estrone is as 40 to 1.

The invention will appear more fully from the examples which follow. These examples are set forth by way of illustration only and it will be understood that the invention is not to be construed as limited in spirit or in scope by the details contained therein as many modifications in materials and methods will be apparent in this disclosure to those skilled in the art. In these examples temperatures are given in degrees centigrade (° C.). Quantities of materials are expressed in parts by weight and in parts by volume which bear the same relation one to the other as kilograms to liters.

EXAMPLE 1

16β,17β-epoxy-1,3,5(10)-estratriene

A solution of 3 parts by weight of potassium hydroxide and 0.7 part by weight of 16α-bromo-1,3,5(10)-estratrien-17β-ol in 75 parts by volume of methanol is heated at reflux under nitrogen for 16 hours. The solution is cooled, diluted with water and extracted with benzene. The extract is washed with water, dried over magnesium sulfate and concentrated in vacuo. The residue is dissolved in 100 parts by volume of hexane and chromatographed on 40 parts by weight of silica. The chromatographic column is washed with 1000 parts by volume of 70% benzene in hexane and eluted with 500 parts by volume of 90% benzene in hexane. The solvents are removed in vacuo and the residue is crystallized from methanol to yield 16β,17β-epoxy-1,3,5(10)-estratriene which melts at 112–113°.

EXAMPLE 2

3-methoxy-16β,17β-epoxy-1,3,5(10)-estratriene

A solution of 6 parts by weight of potassium hydroxide and 4.35 parts by weight of 3-methoxy-16α-bromo-1,3,5(10)-estratrien-17β-ol in 150 parts by volume of methanol is heated at reflux for 19 hours. The solution is then cooled, diluted with water, and filtered to remove the crystalline product which is then washed well with water and dried, yielding 3.40 parts of the desired material, M.P. 105–108°. This substance is purified by solution in Skellysolve B and chromatography on 30 parts by weight of silica. Elution is accomplished with a solution of 25% benzene in hexane. Recrystallization from ether yields the pure 3-methoxy-16β,17β-epoxy-1,3,5(10)-estratriene, M.P. 116.0–116.5° [α]$_D$=+115° (1.0% in chloroform).

By substituting an equivalent quantity of 3-butoxy-16α-bromo - 1,3,5(10) - estratrien-17β-ol or 3-acetoxy-16α-bromo - 1,3,5(10)-estratrien-17β-ol and otherwise proceeding according to the herein described processes 3-butoxy-16β,17β-epoxy - 1,3,5(10) - estratriene and 3-hydroxy-16β,17β-epoxy-1,3,5(10)-estratriene are obtained.

EXAMPLE 3

16α-bromo-1,3,5(10)-estratrien-17β-ol

A solution of 10.8 parts by weight of 1,3,5(10)-estratrien-17-one in 400 parts by volume of isopropenyl acetate containing 4.0 parts by weight of p-toluenesulfonic acid is slowly distilled for 18 hours. The solution is cooled and diluted with benzene. Excess aqueous potassium carbonate is added and the mixture extracted with benzene, the benzene extract washed with water, dried over magnesium sulfate and the solvent removed in vacuo. The residue is dissolved in hexane and chromotographed quickly over fuller's earth (sold under the trade name Florex). The chromatographic column is eluted with 2000 parts by volume of hexane, the solvent removed from the eluate in vacuo to yield 1,3,5(10),16-estratetraene-17-ol acetate which, after recrystallization from hexane, melts at 109–111°.

A solution of 1.23 parts by weight of 1,3,5(10),16-estratetraene-17-ol acetate in 15 parts by volume of carbon tetrachloride and 10 parts by weight of anhydrous potassium carbonate is stirred vigorously at 0–5° and to this solution is added in 5 minutes, 0.79 part by weight of bromine dissolved in 30 parts by volume of carbon tetrachloride. Excess aqueous sodium thiosulfate is added and the solution is extracted with chloroform. The chloroform extract is washed with water, dried over magnesium sulfate and the solvent removed in vacuo. The residue is recrystallized from methanol to yield 16α-bromo-1,3,5(10)-estratrien-17-one which melts at 163–166°, exhibits a specific rotation of +126° in chloroform and exhibits an absorption maximum in the infrared at 5.73 microns.

To a slurry of 0.2 part by weight of lithium aluminum hydride in 25 parts by volume of ether is added with stirring while cooling to 0°, a solution of 1.1 parts by weight of 16α-bromo-1,3,5(10)-estratrien-17-one in 15 parts by volume of tetrahydrofuran. The solution is stirred for 10 minutes; then water and dilute hydrochloric acid are added cautiously. The mixture is extracted with benzene, the extract washed successively with water and potassium bicarbonate solution and dried over magnesium sulfate. The solvent is removed in vacuo and the residue is dissolved in 20 parts by volume of hexane, then chromatographed on 50 parts by weight of fuller's earth. The chromatographic column is washed with 500 parts by volume of hexane and eluted with 2000 parts by volume of 5% benzene in hexane. The solvents are removed from the eluate and the residue crystallized from hexane to yield 16α-bromo-1,3,5(10)-estratrien-17α-ol which melts at 168–169° and exhibits a specific rotation of +74° in chloroform.

The chromatographic column is washed with 1000 parts by volume of 10% benzene in hexane and eluted further with 2000 parts by volume of 20% benzene in hexane. The solvent is removed from the eluate in vacuo and the residue crystallized from hexane to yield 16α-bromo-1,3,5(10)-estratrien-17β-ol which melts at 100–101° and exhibits a specific rotation of +77° in chloroform.

By substituting an equivalent quantity of 3-butoxy-1,3,5(10)-estratrien-17-one or 3-hydroxy-1,3,5(10)-estratrien-17-one and otherwise proceeding according to the herein described processes, 3-butoxy-16α-bromo - 1,3,5 (10) - estratrien - 17β - ol and 3 - acetoxy - 16α - bromo-1,3,5(10)estratrien-17β-ol are obtained.

EXAMPLE 4

3-butoxy-1,3,5(10)-estratrien-17-one (estrone 3 - butyl ether)

A combination of 18.2 parts by weight of estrone, 500 parts by volume of ethanol, 40 parts by weight of potassium carbonate and 107 parts by volume of normal butyl iodide is stirred under reflux for 4 hours, then concentrated to one-half volume, cooled and filtered. The filtered solution is distilled to dryness and the residue dissolved in a mixture of water and methylene chloride. The organic layer is separated, washed with water, distilled to dryness and the residue recrystalized twice from methanol to yield estrone 3-n-butyl ether, M.P. 106–107°.

EXAMPLE 5

16β,17β-epoxy-3-isobutyroxy-1,3,5(10)-estratriene

A solution of 2 parts by weight of 3-hydroxy-16β,17β-epoxy-1,3,5(10)-estratriene in 40 parts by volume of pyridine and 30 parts by volume of isobutyric anhydride is allowed to stand at room temperature for 24 hours. The mixture is then diluted with 400 parts by volume of water. The solid which precipitates is collected, washed with water, dried and recrystallized from aqueous acetone to yield 16β,17β-epoxy-3-isobutyroxy-1,3,5(10)-estratriene.

By substituting an equivalent quantity of acetic anhydride and otherwise proceeding according to the herein described processes, 3-acetoxy-16β,17β-epoxy-1,3,5(10)-estratriene is obtained.

What is claimed is:
1. A compound of the formula

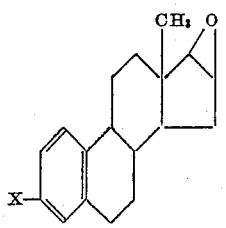

wherein X is a lower alkoxy radical.
2. 16β,17β-epoxy-1,3,5(10)-estratriene.
3. 3-methoxy-16β,17β-epoxy-1,3,5(10)-estratriene.
4. 3-butoxy-16β,17β-epoxy-1,3,5(10)-estratriene.

References Cited in the file of this patent
UNITED STATES PATENTS 2,874,173    Hogg et al. _____ Feb. 17, 1959

OTHER REFERENCES

Prelog et al.: Helv. Chim. Acta, vol. 28, pages 250–6 (1945) (abstracted in C.A. 40:890).
"Pouvoirs Rotatoires Naturels des Stéroïdes," Mathieu et al. page 24 (1956).